United States Patent
Lee

(10) Patent No.: US 12,412,948 B2
(45) Date of Patent: Sep. 9, 2025

(54) BATTERY PACK HAVING STRUCTURE ALLOWING INPUT OF COOLING WATER INTO BATTERY MODULE UPON OCCURRENCE OF THERMAL RUNAWAY PHENOMENON AND ESS COMPRISING SAME

(71) Applicant: LG ENERGY SOLUTION, LTD., Seoul (KR)

(72) Inventor: Jin-Kyu Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 554 days.

(21) Appl. No.: 17/773,254

(22) PCT Filed: Jan. 4, 2021

(86) PCT No.: PCT/KR2021/000032
§ 371 (c)(1),
(2) Date: Apr. 29, 2022

(87) PCT Pub. No.: WO2021/177585
PCT Pub. Date: Sep. 10, 2021

(65) Prior Publication Data
US 2022/0367941 A1     Nov. 17, 2022

(30) Foreign Application Priority Data
Mar. 5, 2020    (KR) .................. 10-2020-0027903

(51) Int. Cl.
*H01M 10/6568*    (2014.01)
*H01M 10/6556*    (2014.01)
(Continued)

(52) U.S. Cl.
CPC ... *H01M 10/6568* (2015.04); *H01M 10/6556* (2015.04); *H01M 10/6566* (2015.04); *H01M 50/258* (2021.01); *H01M 50/507* (2021.01)

(58) Field of Classification Search
CPC ......... H01M 10/6568; H01M 10/6556; H01M 10/6566; H01M 50/258; H01M 50/507;
(Continued)

(56) References Cited

U.S. PATENT DOCUMENTS 10,396,379 B2    8/2019    Ha
2016/0336627 A1  11/2016   Syed et al.
(Continued)

FOREIGN PATENT DOCUMENTS

CN    103606693 A  *  2/2014 ........ H01M 8/04014
CN    106159138 A     11/2016
(Continued)

OTHER PUBLICATIONS

International Search Report (PCT/ISA/210) issued in PCT/KR2021/000032 mailed on Apr. 22, 2021.
(Continued)

*Primary Examiner* — Kaity V Chandler
(74) *Attorney, Agent, or Firm* — Birch, Stewart, Kolasch & Birch, LLP

(57) ABSTRACT

A battery pack includes a pack housing; a plurality of battery modules; a water tank connected to the plurality of battery modules; a coolant tube including a main tube connected to the water tank, a plurality of supply tubes configured to connect the main tube and the battery modules to each other, and a bypass tube connected to the main tube at a point above a supply tube located at a top end among the plurality of supply tubes and at a point below a supply tube located at a bottom end; at least one sensor installed in the pack housing to detect a thermal runaway phenomenon generated
(Continued)

in at least a part of the plurality of battery modules; and a controller configured to output a control signal for introducing a coolant into the battery module through the coolant tube when a thermal runaway phenomenon is detected by the sensor.

15 Claims, 11 Drawing Sheets

(51) Int. Cl.
  *H01M 10/6566* (2014.01)
  *H01M 50/258* (2021.01)
  *H01M 50/507* (2021.01)

(58) Field of Classification Search
  CPC ........... H01M 10/486; H01M 10/6563; H01M 2220/10; H01M 10/48; H01M 10/613; H01M 10/627; H01M 10/63; H01M 10/6561; H01M 50/209; H01M 50/503; H01M 50/20; H01M 2200/10; H01M 10/482; H01M 10/6553; H01M 50/24; H01M 50/251; Y02E 60/10; A62C 3/16; A62C 2/065
  See application file for complete search history.

(56) References Cited

U.S. PATENT DOCUMENTS

| | | | |
|---|---|---|---|
| 2017/0301967 | A1 | 10/2017 | Kim |
| 2018/0048037 | A1 | 2/2018 | Newman |
| 2020/0335839 | A1* | 10/2020 | Hekmat ............... H01M 10/659 |
| 2021/0154503 | A1* | 5/2021 | Ginder .................... A62C 35/62 |

FOREIGN PATENT DOCUMENTS

| | | | | | |
|---|---|---|---|---|---|
| CN | 206566409 | U | * | 10/2017 | ............. A62C 37/11 |
| CN | 107799688 | A | | 3/2018 | |
| CN | 108091803 | A | | 5/2018 | |
| CN | 108511637 | A | | 9/2018 | |
| CN | 108963381 | A | * | 12/2018 | ............. F16K 31/20 |
| CN | 109432634 | A | | 3/2019 | |
| CN | 109546261 | A | | 3/2019 | |
| CN | 109585744 | A | | 4/2019 | |
| CN | 208908248 | U | * | 5/2019 | ............. Y02E 60/10 |
| CN | 109860442 | A | | 6/2019 | |
| CN | 109999386 | A | | 7/2019 | |
| CN | 209104319 | U | * | 7/2019 | ............. Y02E 60/10 |
| CN | 110165327 | A | * | 8/2019 | ............... C09K 5/06 |
| CN | 209859996 | U | | 12/2019 | |
| CN | 107181020 | A | | 5/2025 | |
| JP | 2000-188135 | A | | 7/2000 | |
| JP | 2005251431 | A | * | 9/2005 | ............. Y02E 60/50 |
| JP | 2008-251263 | A | | 10/2008 | |
| JP | 2013187159 | A | * | 9/2013 | .......... H01M 10/482 |
| JP | 3187696 | U | | 12/2013 | |
| JP | 2014-4165 | A | | 1/2014 | |
| JP | 2015-153616 | A | | 8/2015 | |
| JP | 2016-91665 | A | | 5/2016 | |
| JP | 2017-10648 | A | | 1/2017 | |
| JP | 2018-55768 | A | | 4/2018 | |
| JP | 2018-63765 | A | | 4/2018 | |
| JP | 2018-63766 | A | | 4/2018 | |
| KR | 10-2004-0094172 | A | | 11/2004 | |
| KR | 10-2006-0102830 | A | | 9/2006 | |
| KR | 10-2013-0129537 | A | | 11/2013 | |
| KR | 10-2016-0047345 | A | | 5/2016 | |
| KR | 10-2017-0044477 | A | | 4/2017 | |
| WO | WO 2004/096370 | A1 | | 11/2004 | |

OTHER PUBLICATIONS

Extended European Search Report for coresponding European Application No. 21764988.8, dated Nov. 14, 2022.

* cited by examiner

BATTERY PACK HAVING STRUCTURE ALLOWING INPUT OF COOLING WATER INTO BATTERY MODULE UPON OCCURRENCE OF THERMAL RUNAWAY PHENOMENON AND ESS COMPRISING SAME

TECHNICAL FIELD

The present disclosure relates to a battery pack having a structure for introducing a coolant into a battery module when a thermal runaway phenomenon occurs, and an energy storage system (ESS) including the battery pack, and more particularly, to a battery pack having a structure capable of preventing a thermal runaway phenomenon from spreading to neighboring battery modules by efficiently introducing a coolant into battery modules in which problem occurs, when the risk of occurrence of a thermal runaway phenomenon is detected in two or more battery modules among a plurality of battery modules of the battery pack, and ESS including the battery pack.

The present application claims priority to Korean Patent Application No. 10-2020-0027903 filed on Mar. 5, 2020 in the Republic of Korea, the disclosures of which are incorporated herein by reference.

BACKGROUND ART

In a battery module that includes a plurality of battery cells, if an abnormality such as a short circuit occurs in some battery cells to raise temperature continuously so that the temperature of the battery cell exceeds a critical temperature, a thermal runaway phenomenon occurs. If a thermal runaway phenomenon occurs in some battery cells as described above, safety issues may be generated.

If a flame or the like is generated due to the thermal runaway phenomenon occurring in some battery cells, the flame rapidly raises the temperature of adjacent battery cells, and thus the thermal runaway phenomenon may be propagated to adjacent cells within a short time.

Eventually, if the thermal runaway phenomenon occurring in some battery cells is not quickly responded, it may lead to disasters such as ignition and explosion of a battery module or a battery pack, which is a battery unit with a greater capacity than the battery cell, and this may not only result in property damage but also cause safety problems.

Thus, if a flame occurs due to the thermal runaway phenomenon in some battery cells inside the battery module, it is urgently necessary to quickly lower the temperature inside the battery module to prevent the flame from spreading further.

Moreover, a battery module adopting an air-cooled structure has an air channel through which a coolant leaks without staying inside even though the coolant is introduced to lower the temperature inside the battery module and extinguish the flame. Thus, it is demanded to develop a battery pack having a structure capable of blocking the air channel when a coolant is introduced into a battery module where a thermal runaway phenomenon has occurred.

DISCLOSURE

Technical Problem

The present disclosure is designed to solve the problems of the related art, and therefore the present disclosure is directed to preventing a flame from spreading greatly by rapidly lowering the temperature inside a battery module when the flame is generated in some battery cells in the battery module due to a thermal runaway phenomenon.

However, the technical problem to be solved by the present disclosure is not limited to the above, and other objects not mentioned herein will be understood from the following description by those skilled in the art.

Technical Solution

In one aspect of the present disclosure, there is provided a battery pack, comprising: a pack housing; a plurality of battery modules stacked in the pack housing; a water tank connected to the plurality of battery modules and configured to store a coolant; a coolant tube including a main tube connected to the water tank, a plurality of supply tubes configured to connect the main tube to each of the battery modules, and a bypass tube connected to the main tube at a first point above a supply tube located at a top end among the plurality of supply tubes and at a second point below a supply tube located at a bottom end among the plurality of supply tubes; at least one sensor installed in the pack housing to detect a thermal runaway phenomenon generated in at least a part of the plurality of battery modules; and a controller configured to output a control signal for introducing a coolant into the battery module through the coolant tube when a thermal runaway phenomenon is detected by the at least one sensor.

Each of the plurality of battery modules battery module may include a cell stack formed by stacking a plurality of battery cells; a module housing configured to accommodate the cell stack; an air inlet formed through the module housing at a first side of the cell stack in a stacking direction; and an air outlet formed through the module housing at a second side of the cell stack in the stacking direction.

Each of the plurality of battery modules may include an expansion pad disposed inside each of the air inlet and the air outlet and configured to expand due to contact with the coolant introduced into the battery module to close the air inlet and the air outlet.

Each of the plurality of battery modules may include a pair of bus bar frames respectively coupled to the first side and the second side of the cell stack.

The air inlet and the air outlet may be formed at locations corresponding to an empty space formed between the bus bar frame and the module housing.

The supply tube may pass through the module housing from the first side of the cell stack to the second side and communicate with an empty space formed between the bus bar frame and the module housing.

The battery pack may include a plurality of valves respectively installed in the plurality of supply tubes, and the plurality of valves may be respectively installed adjacent to the plurality of battery modules to individually allow or block the flow of coolant flowing into the plurality of battery modules.

The at least one sensor may be installed to each of the plurality of battery modules.

The controller may output the control signal to open a valve installed adjacent to a battery module of the plurality of battery modules where a thermal runaway phenomenon is detected by the at least one sensor, among the plurality of valves.

The battery pack may include a barrier installed in each of the plurality of supply tubes.

The barrier may be broken broken when a temperature of the battery module exceeds a reference temperature.

Meanwhile, an energy storage system (ESS) according to an embodiment of the present disclosure comprises a plurality of battery packs according to the present disclosure.

Advantageous Effects

According to one aspect of the present disclosure, when a flame is generated in some battery cells inside the battery module due to a thermal runaway phenomenon, it is possible to prevent the flame from spreading further by lowering the temperature inside the battery module quickly.

In addition, according to another aspect of the present disclosure, in a battery pack including an air-cooled battery module, when a coolant is introduced into the battery module where a thermal runaway phenomenon occurs, it is possible to effectively prevent the thermal runaway phenomenon from propagating by adopting a structure in which the air channel for cooling is blocked so that the coolant stays inside the battery module.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
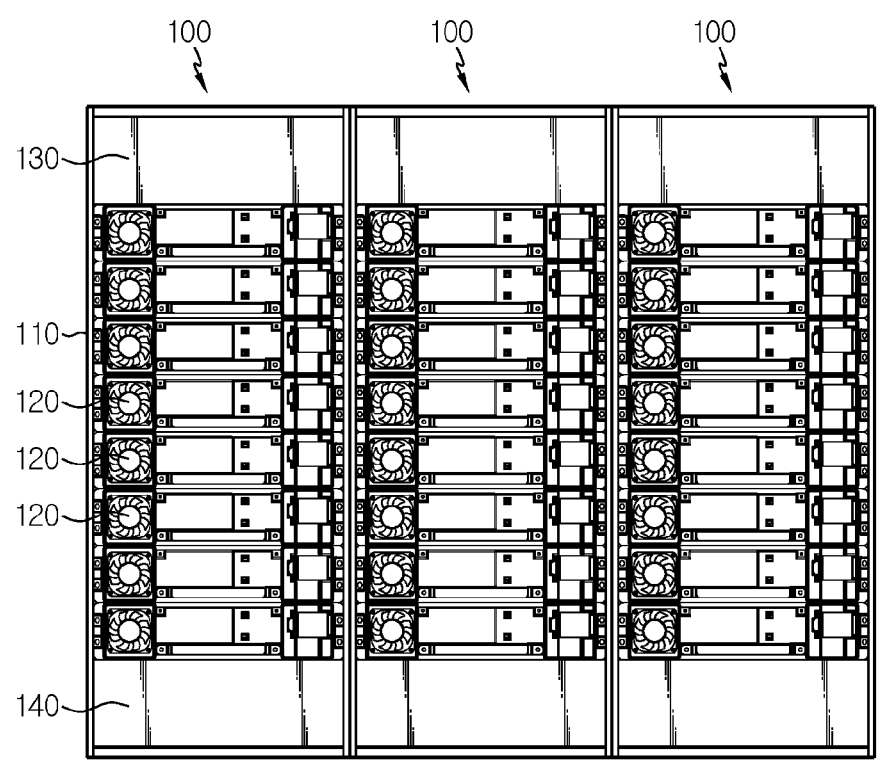
FIG. 1 is a diagram showing an energy storage system (ESS) according to an embodiment of the present disclosure.

Referring to FIG. 1, an energy storage system (ESS) according to an embodiment of the present disclosure includes a plurality of battery packs 100 according to an embodiment of the present disclosure.

Figure 2:
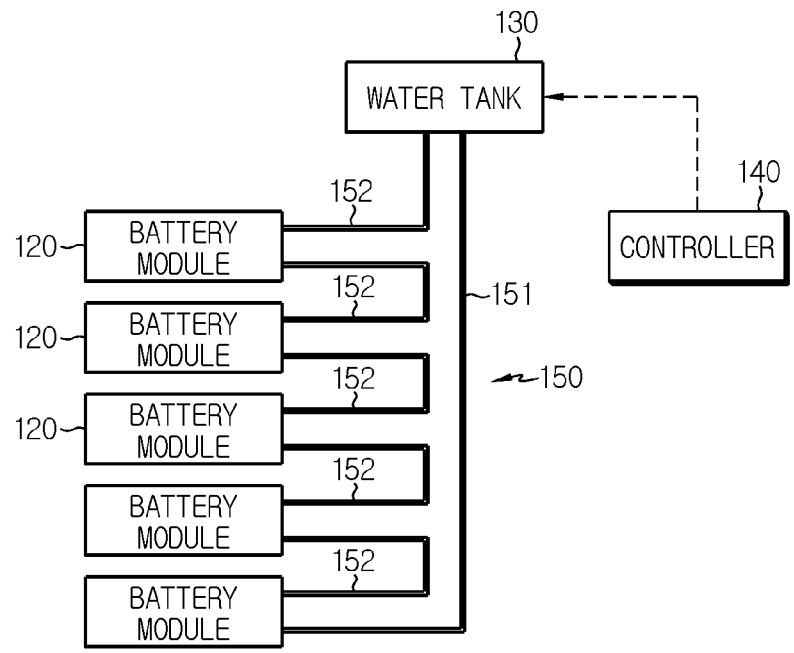
FIG. 2 is a diagram for illustrating the connection structure between a water tank and a battery module and the relationship between the water tank and a controller, in a battery pack according to an embodiment of the present disclosure.
Figure 3:
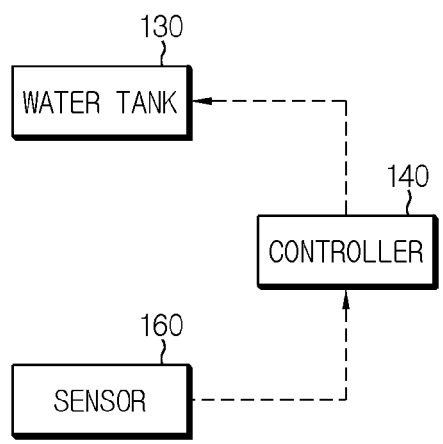
FIG. 3 is a diagram for illustrating the relationship among a sensor, the controller and the water tank, in the battery pack according to an embodiment of the present disclosure.

Referring to FIGS. 1 to 3, the battery pack 100 according to an embodiment of the present disclosure includes a pack housing 110, a battery module 120, a water tank 130, a controller 140, a coolant tube 150 and a sensor 160.

The pack housing 110 is an approximately rectangular frame that defines the appearance of the battery pack 100, and has a space formed therein so that the plurality of battery modules 120, the water tank 130, the controller 140, the coolant tube 150 and the sensor 160 may be installed therein.

The battery module 120 is provided in plural, and the plurality of battery modules 120 are vertically stacked in the pack housing 110 to form a single module stack. The specific structure of the battery module 120 will be described later in detail with reference to FIGS. 4 to 6.

The water tank 130 is provided inside the pack housing 110 and stores a coolant that is to be supplied to the battery module 120 when a thermal runaway phenomenon occurs at the battery module 120. The water tank 130 may be disposed above the module stack for quick and smooth supply of coolant. In this case, even though a separate coolant pump is not used, the coolant may be rapidly supplied to the battery module 120 by free fall and water pressure of the coolant. Of course, a separate coolant pump may also be applied to the water tank 130 to supply the coolant more quickly and smoothly. In this case, if a coolant pump has a sufficient pressure, the water tank 130 may be disposed at the same height as the module stack or at a lower position.

The controller 140 may be connected to the sensor 160 and the water tank 130 and output a control signal to open the water tank 130 and/or a control signal to operate the coolant pump according to the sensing signal of the sensor 160. In addition, the controller 140 may additionally perform a function as a battery management system (BMS) that is connected to each battery module 120 to manage charging and discharging thereof, in addition to the above function.

The controller 140 outputs a control signal to open the water tank 130 when detecting gas or a temperature rise above a reference value inside the battery pack 100 due to a thermal runaway phenomenon occurring in at least one of the plurality of battery modules 120, and allows the coolant to be supplied to the battery module 120 accordingly.

If the water tank 130 is opened according to the control signal of the controller 140, the coolant is sequentially supplied from a battery module 120 located at an upper portion to a battery module 120 located at a lower portion. Thus, the flame in the battery modules 120 is extinguished and also the battery modules 120 are cooled, thereby preventing the thermal runaway phenomenon from spreading throughout the battery pack 100.

The coolant tube 150 connects the water tank 130 and the battery module 120 to each other, and functions as a passage for carrying the coolant supplied from the water tank 130 to the battery module 120. To perform this function, one end of the coolant tube 150 is connected to the water tank 130, and the other end of the coolant tube 150 is branched by the number of the battery modules 120 and connected to the plurality of battery modules 120, respectively. Detail structure of the coolant tube 150 will be described later with reference to FIGS. 7 to 11.

If the thermal runaway phenomenon occurs in at least a part of the plurality of battery modules 120 as described above, the sensor 160 detects a temperature rise and/or a gas ejection and transmits a detection signal to the controller 140. To perform this function, the sensor 160 may be a temperature sensor or a gas detection sensor, or a combination of the temperature sensor and the gas detection sensor.

The sensor 160 is installed inside the pack housing 110 to detect temperature rise or gas generation inside the battery pack 100. The sensor 160 may be attached to an inner side or outer side of each of the plurality of battery modules 120 to quickly sense the temperature of the battery module 120 and/or gas generated from the battery module 120.

Next, the battery module 120 applied to the battery pack 100 according to an embodiment of the present disclosure will be described in more detail with reference to FIGS. 4 and 6 to 12.

Referring to FIGS. 4 and 6 to 12, the battery module 120 may be implemented to include a plurality of battery cells 121, a bus bar frame 122, a module housing 123, an air inlet 124 and an air outlet 125. In addition, referring to FIG. 12, the battery module 120 according to an embodiment of the present disclosure may further include an expansion pad 126 additionally.

The battery cell 121 is provided in plural, and the plurality of battery cells 121 are stacked to form one cell stack. As the battery cell 121, for example, a pouch-type battery cell may be applied. The battery cell 121 includes a pair of electrode leads 121a respectively drawn out at both sides thereof in a longitudinal direction.

The bus bar frame 122 is provided in a pair, and the pair of bus bar frames 122 cover one side and the other side of the cell stack in a width direction. The electrode lead 121a of the battery cell 121 is drawn through a slit formed at the bus bar frame 122, and is bent and fixed by welding or the like onto the bus bar frame 122. That is, the plurality of battery cells 121 may be electrically connected by the bus bar frame 122.

The module housing 123 has a substantially rectangular parallelepiped shape, and accommodates the cell stack therein. The air inlet 124 and the air outlet 125 are formed at one side and the other side of the module housing 123 in the longitudinal direction.

The air inlet 124 is formed at one side of the cell stack in the stacking direction, namely at one side of the battery module 120 in the longitudinal direction and has a hole shape formed through the module housing 123. The air outlet 125 is formed at the other side of the cell stack in the stacking direction, namely at the other side of the battery module 120 in the longitudinal direction and is has a hole shape formed through the module housing 123.

The air inlet 124 and the air outlet 125 are located at diagonally opposite sides along the longitudinal direction of the battery module 120.

Meanwhile, an empty space is formed between the bus bar frame 122 and the module housing 123. That is, the empty space in which air for cooling the battery cell 121 flows is formed between one of six outer surfaces of the module housing 123 facing one side and the other side of the battery cell 121 in the longitudinal direction and the bus bar frame 122. The empty space is formed at each of both sides of the battery module 120 in the width direction.

The air inlet 124 is formed at a location corresponding to the empty space formed at one side of the battery module 120 in the width direction, and the air outlet 125 is formed at a location corresponding to the empty space formed at the other side of the battery module 120 in the width direction.

In the battery module 120, the air introduced therein through the air inlet 124 cools the battery cell 121 while moving from the empty space formed at one side of the battery module 120 in the width direction to the empty space formed at the other side of the battery module 120 in the width direction, and then goes out through the air outlet 125. That is, the battery module 120 corresponds to an air-cooled battery module.

Figure 12:
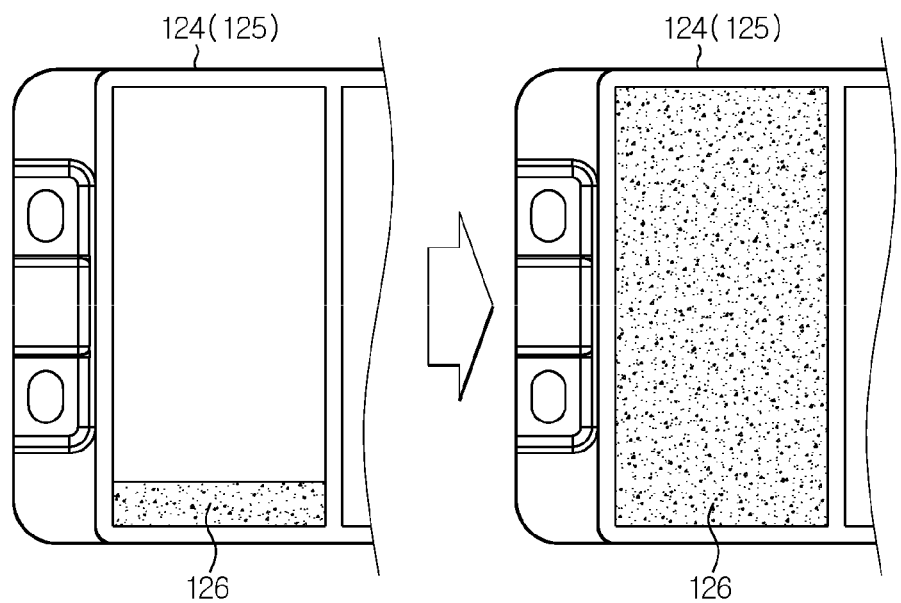
FIG. 12 is a diagram showing an expansion pad applied to the battery pack according to an embodiment of the present disclosure.

Referring to FIG. 12, the expansion pad 126 is disposed inside the air inlet 124 and the air outlet 125, and has a size smaller than the opened area of the air inlet 124 and the air outlet 125. The expansion pad 126 preferably has a size of less than about 30% compared to the opened area of the air inlet 124 and air outlet 125 so that the air may flow through the air inlet 124 and the air outlet 125 smoothly when the battery module 120 is normally used.

The expansion pad 126 is expanded by contacting the coolant introduced into the battery module 120 to close the air inlet 124 and the air outlet 125. The expansion pad 126 contains a resin that exhibits a very large expansion rate when absorbing moisture, for example a resin that increases in volume by at least about two times or more compared to the initial volume when a sufficient amount of moisture is provided thereto. As a resin used for the expansion pad 126, a polyester staple fiber is mentioned, for example.

By applying the expansion pad 126, when a thermal runaway phenomenon occurs in at least some battery modules 120 and thus a coolant is introduced into the battery modules 120, the air inlet 124 and the air outlet 125 are closed. If the air inlet 124 and the air outlet 125 are closed as above, the coolant introduced into the battery module 120 does not escape to the outside but stays inside the battery modules 120, thereby quickly resolving the thermal runaway phenomenon occurring in the battery modules 120.

Next, the coolant tube 150 applied to the battery pack 100 according to an embodiment of the present disclosure will be described in more detail with reference to FIGS. 7 to 11 along with FIGS. 2 and 6.

Figure 6:
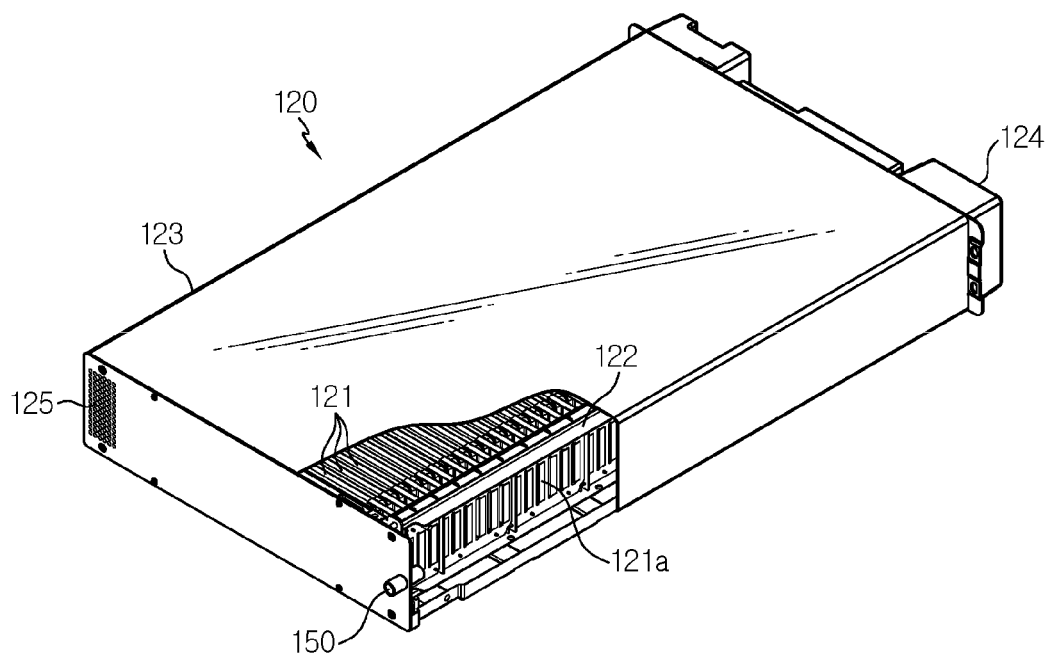
FIG. 6 is a diagram showing an inner structure of the battery module applied to the battery pack according to an embodiment of the present disclosure.
Figure 7:
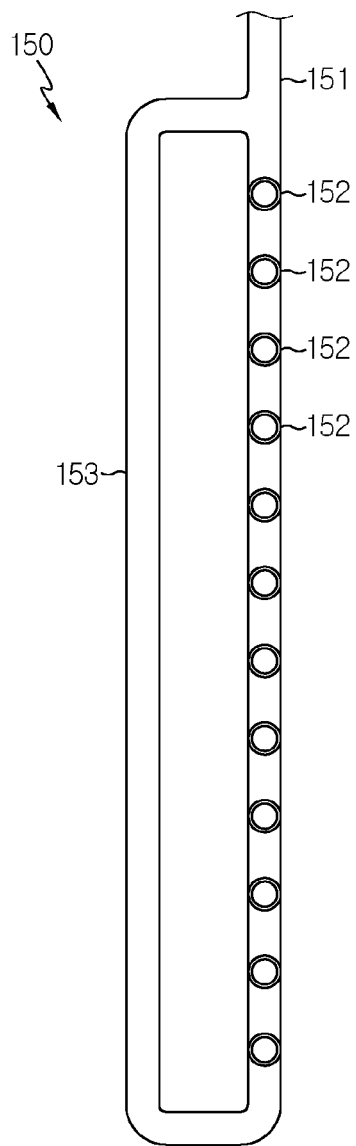
FIGS. 7 to 11 are diagrams showing a detailed configuration of a coolant tube applied to the present disclosure.

Referring to FIGS. 7 to 11 along with FIGS. 2 and 6, the coolant tube 150 includes a main tube 151, a plurality of supply tubes 152, and a bypass tube 153. In addition, the coolant tube 150 may further include at least one sub bypass tube 154 additionally.

The main tube 151 is directly connected to the water tank 130. The main tube 151 has a shape extending downward from the water tank 130 along a stacking direction of the module stack.

The plurality of supply tubes 152 are branched from the main tube 151 to connect the battery modules 120 to each other. The supply tube 152 is provided in the same number as the number of battery modules 120. The supply tube 152 passes through the module housing 123 from one side or the other side of the cell stack in the stacking direction and communicates with an empty space formed between the bus bar frame 122 and the module housing 123. That is, the supply tube 152 may be inserted through the same surface as the surface in which the air inlet 124 is formed or the surface in which the air outlet 125 is formed, among six surfaces of the module housing 123.

Figure 4:
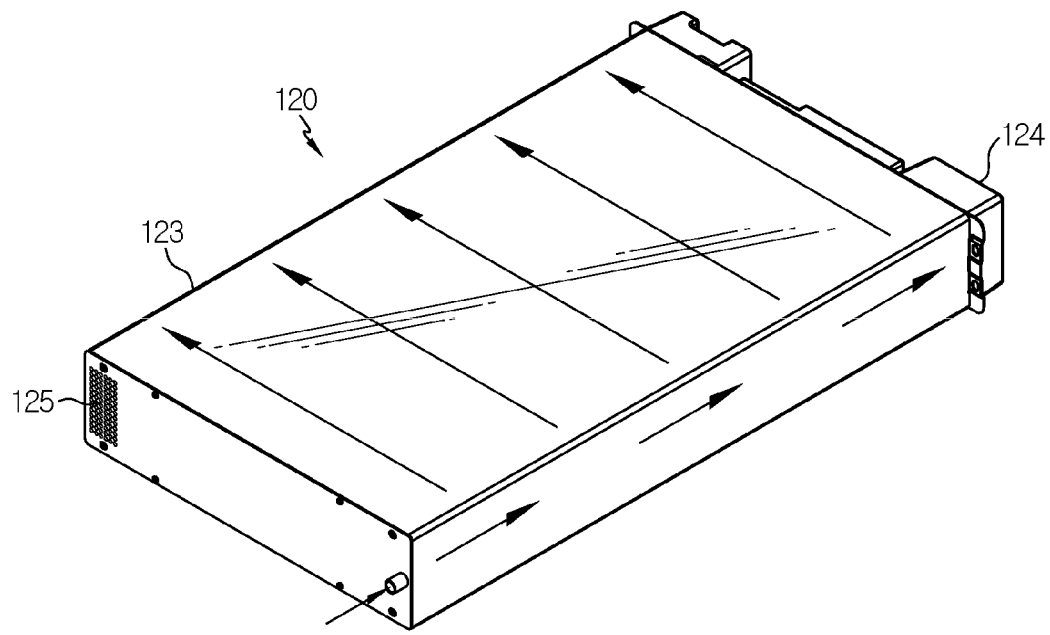
FIGS. 4 and 5 are perspective views showing a battery module applied to the battery pack according to an embodiment of the present disclosure.
Figure 5:
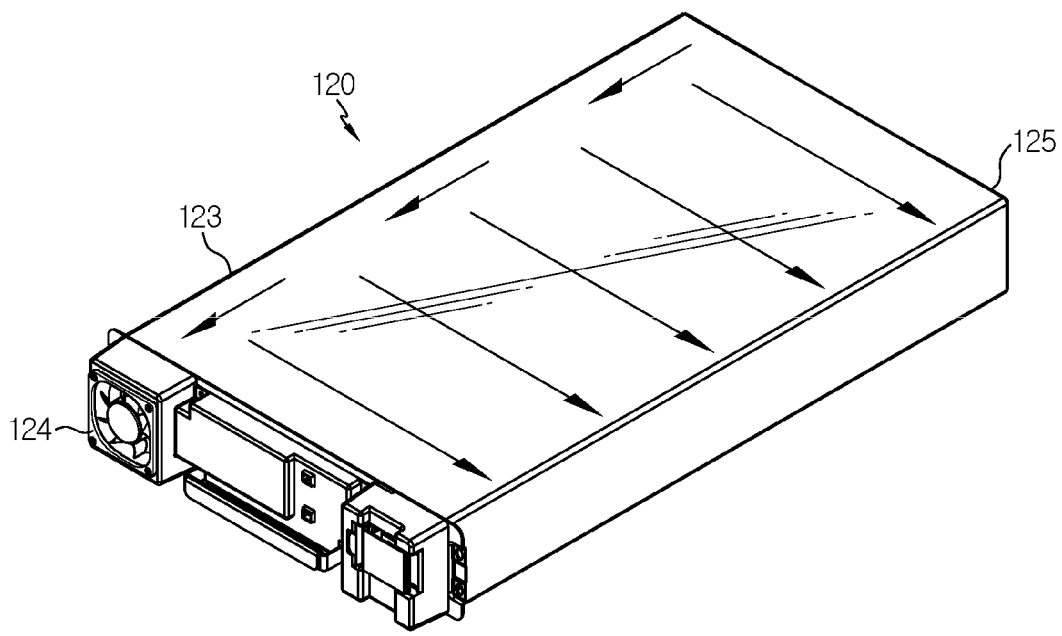

Therefore, as shown in FIGS. 4 and 5, the coolant introduced into the battery module 120 through the supply tube 152 flows from the empty space formed at one side of the battery module 120 in the width direction to the empty space formed at the other side of the battery module 120 in the width direction and fills the inside of the battery module 120.

The bypass tube 153 is connected to the main tube 151. The bypass tube 153 connects one longitudinal side and the other longitudinal side of the main tube 151. That is, the bypass tube 153 and the main tube 151 are connected at two points. A first connection point is located above a supply tube 152 located at a top end along the stacking direction of the module stack, and a second connection point is located below a supply tube 152 located at a bottom end along the stacking direction of the module stack. Due to the bypass tube 153, the battery pack 100 according to the present disclosure may supply the coolant from at the upper and lower portions of the module stack at the same time, thereby minimizing the occurrence of deviation in the amount of coolant supplied to the plurality of battery modules 120.

Meanwhile, the sub bypass tube 154 connects the bypass tube 153 and the main tube 151 between both ends of the bypass tube 153. When the plurality of supply tubes 152 are grouped into a plurality of supply tube groups along a direction from top to bottom and each group includes at least two supply tubes 152, the sub bypass tube 154 may be respectively connected between adjacent supply tube groups.

Figure 8:
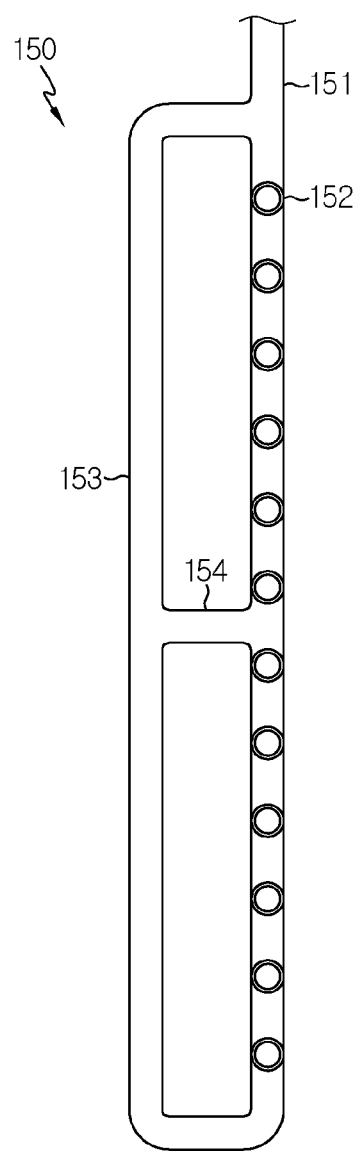

Referring to FIG. 8, a case where two supply tube groups are formed by grouping six supply tubes 152 into one supply tube group along a direction from top to bottom and the sub bypass tube 154 is connected between the two supply tube groups is illustrated.

Figure 9:
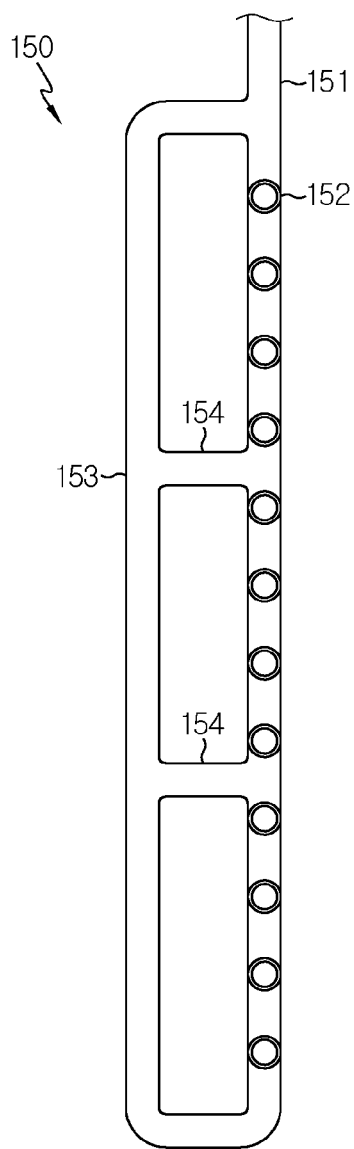

Referring to FIG. 9, a case where three supply tube groups are formed by grouping four supply tubes 152 into one supply tube group along a direction from top to bottom and the sub bypass tube 154 is respectively connected between adjacent supply tube groups is illustrated.

Figure 10:
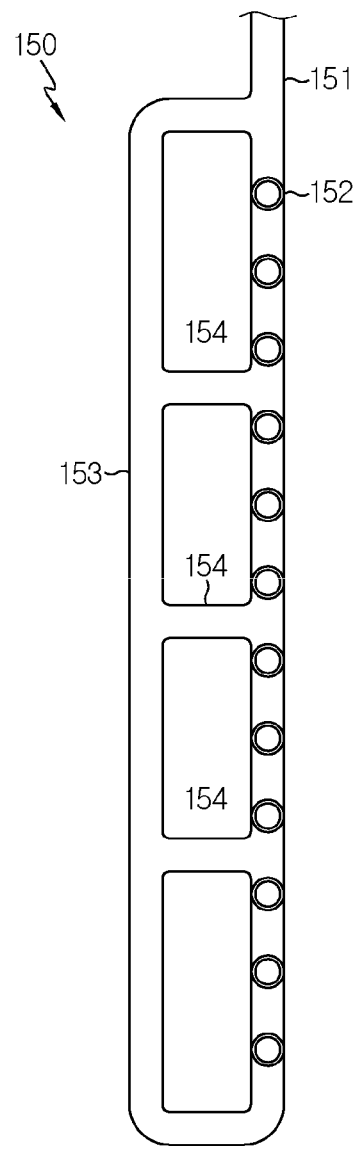

Referring to FIG. 10, a case where four supply tube groups are formed by grouping three supply tubes 152 into one supply tube group along a direction from top to bottom and the sub bypass tube 154 is respectively connected between adjacent supply tube groups is illustrated.

Figure 11:
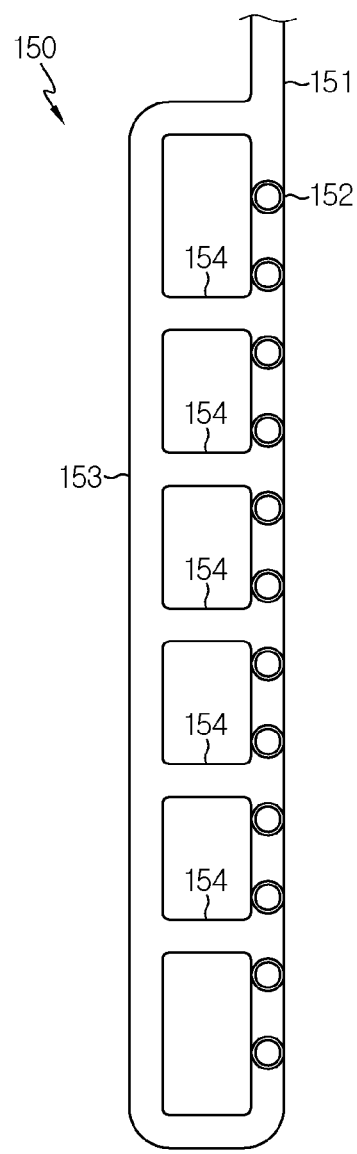

Referring to FIG. 11, a case where six supply tube groups are formed by grouping two supply tubes 152 into one supply tube group along a direction from top to bottom and the sub bypass tube 154 is respectively connected between adjacent supply tube groups is illustrated.

The examples shown in FIGS. 8 to 11 show only the cases where each supply tube group is formed with the same number of supply tubes 152, but the present disclosure is not limited thereto, and a case where different supply tube groups have a different number of supply tubes 152 also falls within the scope of the present disclosure.

Figure 13:
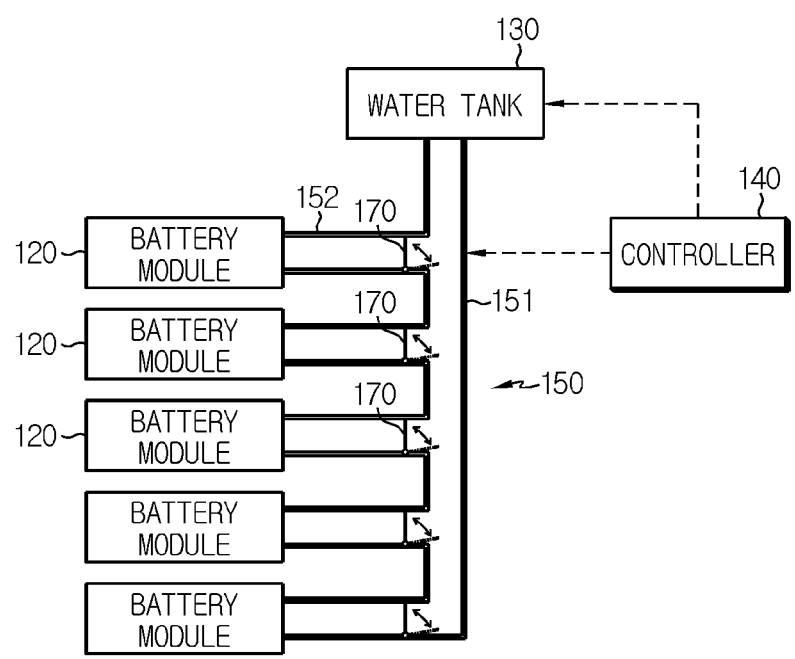
FIG. 13 is a diagram showing a battery pack according to another embodiment of the present disclosure to which a valve is applied.

Next, a battery pack according to another embodiment of the present disclosure will be described with reference to FIG. 13.

The battery pack according to another embodiment of the present disclosure is different from the battery pack 100 according to an embodiment of the present disclosure described above only in the point that a valve 170 is installed inside the supply tube 152, and other components are substantially the same.

Thus, the battery pack according to another embodiment of the present disclosure will be described based on the valve 170, and the features identical to the former embodiment will not be described in detail.

The valve 170 is provided in plural as much as the number of the plurality of battery modules 120, and the valves 170 are respectively installed adjacent to the plurality of battery modules 120 to individually allow or block the flow of coolant flowing into the plurality of battery modules 120.

As described above, in order to operate the plurality of valves 170 independently, at least one sensor 160 may be provided for each battery module 120. Thus, if the sensor 160 is provided for every battery module 120, it is possible to input the coolant only to some battery modules 120 in which a thermal runaway phenomenon occurs.

That is, if the controller 140 receives a detection signal from some sensors 160, the controller 140 determines that a thermal runaway phenomenon occurs in the battery modules 120 to which the sensors 160 sending the detection signal are attached, and opens the valves 170 installed adjacent to the battery modules 120 where the thermal runaway phenomenon occurs among the plurality of valves 170 so that the coolant may be put thereto.

Figure 14:
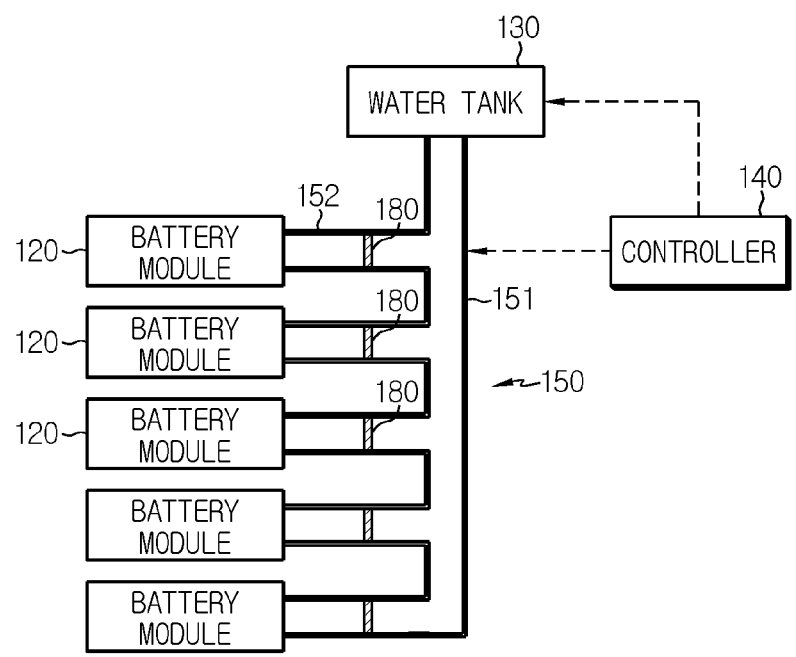
FIG. 14 is a diagram showing a battery pack according to still another embodiment of the present disclosure to which a barrier opened by heat is applied.

Next, a battery pack according to still another embodiment of the present disclosure will be described with reference to FIG. 14 along with FIG. 6.

The battery pack according to still another embodiment of the present disclosure differs from the battery pack 100 according to another embodiment of the present disclosure, described above, in that a barrier 180 is installed in the supply tube 152 instead of the valve 170, and other components are substantially the same.

Therefore, in describing the battery pack according to still another embodiment of the present disclosure, the barrier 180 will be described in detail, and other components substantially the same as the former embodiment will not be described in detail.

The barrier 180 is installed inside each of the plurality of supply tubes 152 and blocks the coolant from being supplied to the battery module 120 during normal use of the battery pack 100 and the ESS. The barrier 180 is broken when the temperature of the battery module 120 rises and exceeds a reference temperature, so that the coolant may be supplied into the battery module 120 through the supply tube 152.

The barrier 180 may be made of a resin film, and its thickness and specific material may be determined in consideration of the capacity and number of battery cells 121 included in the battery module 120.

As described above, the battery pack according to the present disclosure may prevent a thermal runaway phenomenon from spreading to neighboring battery modules 120 by putting a coolant into the battery module 120 when the thermal runaway phenomenon occurs in the battery module 120. In particular, by applying the bypass tube 153, when the thermal runaway phenomenon occurs in the plurality of battery modules 120, the battery pack according to the present disclosure may uniformly supply the coolant to every battery module 120, which allows the cooling of the battery module 120 relatively far away from the water tank 130 not to be weakened. In addition, since the battery pack according to the present disclosure has a structure in which the air inlet 124 and the air outlet 125 may be closed when a coolant is inserted into the air-cooled battery module 120 so that the coolant may be filled therein, it is possible to more effectively prevent the thermal runaway phenomenon from spreading.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A battery pack, comprising:
    a pack housing;
    a plurality of battery modules stacked in the pack housing;
    a water tank connected to the plurality of battery modules and configured to store a coolant;
    a coolant tube including a main tube connected to the water tank, a plurality of supply tubes configured to connect the main tube to each of the battery modules, and a bypass tube connected to the main tube at a first point above a supply tube located at a top end among the plurality of supply tubes and at a second point below a supply tube located at a bottom end among the plurality of supply tubes, wherein the main tube and the bypass tube form a loop, and wherein the plurality of supply tubes connect to a portion of the main tube forming the loop;
    at least one sensor installed in the pack housing to detect a thermal runaway phenomenon generated in at least a part of the plurality of battery modules; and
    a controller configured to output a control signal for introducing a coolant into the battery module through the coolant tube when a thermal runaway phenomenon is detected by the at least one sensor.

2. The battery pack according to claim 1, wherein each of the plurality of battery modules includes:
    a cell stack formed by stacking a plurality of battery cells;
    a module housing configured to accommodate the cell stack;
    an air inlet formed through the module housing at a first side of the cell stack in a stacking direction; and
    an air outlet formed through the module housing at a second side of the cell stack in the stacking direction.

3. The battery pack according to claim 2, wherein each of the plurality of battery modules includes an expansion pad disposed inside each of the air inlet and the air outlet and configured to expand due to contact with the coolant introduced into the battery module to close the air inlet and the air outlet.

4. The battery pack according to claim 2, wherein each of the plurality of battery modules includes a pair of bus bar frames respectively coupled to the first side and the second side of the cell stack.

5. The battery pack according to claim 4, wherein the air inlet and the air outlet are formed at locations corresponding to an empty space formed between the bus bar frame and the module housing.

6. The battery pack according to claim 4, wherein the supply tube passes through the module housing from the first side of the cell stack to the second side and communicates with an empty space formed between the bus bar frame and the module housing.

7. The battery pack according to claim 2, wherein the battery pack includes a plurality of valves respectively installed in the plurality of supply tubes, and wherein the plurality of valves are respectively installed adjacent to the plurality of battery modules to individually allow or block the flow of coolant flowing into the plurality of battery modules.

8. The battery pack according to claim 7, wherein the at least one sensor is installed to each of the plurality of battery modules.

9. The battery pack according to claim 8, wherein the controller outputs the control signal to open a valve installed adjacent to a battery module of the plurality of battery modules where a thermal runaway phenomenon is detected by the at least one sensor.

10. The battery pack according to claim 2, further comprising a barrier installed in each of the plurality of supply tubes.

11. The battery pack according to claim 10, wherein the barrier is broken when a temperature of the battery module exceeds a reference temperature.

12. An energy storage system (ESS), comprising a plurality of battery packs according to claim 1.

13. The battery pack according to claim 1, further comprising at least one sub bypass tube extending between the main tube and the bypass tube at a point between the first point and the second point.

14. The battery pack according to claim 1, further comprising a plurality of sub bypass tubes extending between the main tube and the bypass tube between the first point and the second point.

15. The battery pack according to claim 14, wherein an equal number of supply tubes of the plurality of supply tubes is located between each pair of adjacent sub bypass tubes of the plurality of sub bypass tubes.

* * * * *